United States Patent [19]

Garschagen et al.

[11] Patent Number: 5,159,741
[45] Date of Patent: Nov. 3, 1992

[54] MACHINE FOR THE MACHINING OF METAL

[75] Inventors: Friedrich A. Garschagen, Remscheid; Hans-Udo Heym, Wuppertal, both of Fed. Rep. of Germany

[73] Assignee: Wera-Werk Hermann Werner GmbH & Co., Wuppertal, Fed. Rep. of Germany

[21] Appl. No.: 688,926

[22] Filed: Apr. 19, 1991

[30] Foreign Application Priority Data

Apr. 26, 1990 [DE] Fed. Rep. of Germany ....... 4013327

[51] Int. Cl.$^5$ ............ B23B 5/36; B23C 1/18
[52] U.S. Cl. .................. 29/27 R; 82/18; 409/166
[58] Field of Search ........... 29/27 A, 27 R, 27 C, 29/27 B; 82/18, 19; 409/55, 44, 165, 166, 199, 200

[56] References Cited

U.S. PATENT DOCUMENTS

| 2,689,498 | 9/1954 | Johnson | 82/18 |
| 3,803,679 | 4/1974 | Elkhardt | 29/27 R |
| 4,141,278 | 2/1979 | Lieser | 409/166 |
| 4,164,891 | 8/1979 | Lieser | 409/165 |
| 4,648,295 | 3/1987 | Ley et al. | 82/18 |
| 4,683,787 | 8/1987 | Link | 29/27 R X |

FOREIGN PATENT DOCUMENTS 90202 7/1980 Japan ......................... 82/18

Primary Examiner—William Briggs
Attorney, Agent, or Firm—Martin A. Farber

[57] ABSTRACT

The invention relates to a machine for machining by cutting with workholder and tool holder rotating in positive drive with respect to each other, the axis (z) of which toolholder extending askew to the workholder axis of rotation (x), is swingable and lockable about an axis (y) which intersects the axis of rotation (x) of the workpiece and the axis (z) of the toolholder at right angles, the toolholder being displaceable in the direction of the axis of rotation (x) of the workholder and the axis of swing (y) of the toolholder. In order to be able to carry out other cutting methods of machining in addition to a milling of a workpiece, the invention proposes providign individual electric drives (6, 7) for workholder (2) and toolholder (5), which drives are connected by an electronic positive drive device (13) and can individually be disconnected from it, the toolholder (5) on its part being seated on a tool slide (16) which is displaceable along the axis of the toolholder and on which there is also arranged a supplementary toolholder (18) which can be brought into working position by relative movement with respect to the tool slide (16).

15 Claims, 5 Drawing Sheets

MACHINE FOR THE MACHINING OF METAL

The present invention relates to a machine for the machining of metal in accordance with the preamble to the main claim.

Such a machine is known from Federal Republic of Germany OS 26 50 955, in which the toolholder bears a flycutter for the simultaneous milling of a plurality of grooves in a revolving workpiece. Machines for the manufacture of gears are also known in which the tool is developed as a hobbing head. Development of the positive drive device between tool spindle and work spindle as an "electronic transmission" is known for instance from "wt Werkstattechnik" 79/1989, page 677. In that case, highly precise synchronous travel between a guide spindle and several follower spindles is assured by electronic regulating and control units.

The known machines however have the disadvantage of being of limited use. These machines are suitable only for the cutting of teeth in workpieces or only for lathe work. It is therefore not possible, for instance, on a machine of this type to carry out lathe work on the revolving workpiece, since the speed of rotation of the workpiece cannot be adjusted to the value required for the necessary cutting speed. Due to the positive drive between toolholder and workholder, the latter always travels slower than the toolholder by the number of teeth of the workpiece. A roughing and final working of the workpieces by lathe work or the like requires another machine tool.

The object of the present invention is therefore to provide a machine of this type with which, in addition to milling work, the workpiece can also be worked by other cutting methods. range upon machining with the supplementary tool with the toolholder stationary so that the high cutting speeds on the workpiece, clamped in the toolholder, which are necessary for the lathe work, can be reached. The speed of rotation of the workholder can, for instance, be set within a range of 0 to about 3000 rpm. By the additional axial displaceability of the toolholder (in the direction of its lengthwise axis), an optimum in-feed, for instance of a lathe tool, is assured. Preferably all axial displacements (linear displacements) of the machine are electronically controllable and synchronizable with the rotation of the workpiece. In this way, the lathe cutting (turning) of non-circular profiles is also made possible. The range of use of the machine is furthermore increased by the fact that a plurality of lathe tools are provided and the supplementary-toolholder is developed as tool change device. The latter is preferably developed as turret. The displaceability of the toolholder—by way of the tool-slide displacement—in the direction of its swing axis, in addition to the displaceability of the approach slide of the toolholder perpendicular to the axis of the workpiece, provides assurance that the lathe tool can always be in-fed with the required entering angle. The development of the toolholder drive as disconnectable from the electronic positive-drive device furthermore makes the stepwise control of the work spindle possible. In this operation, the supplementary tool is preferably developed as an end miller or drill. In this operation, with the workpiece stationary, the supplementary tool is moveable for the machining via displacements of the toolholder in the three directions in space. In accordance with another advantageous embodiment in which the rotating tool is developed as hobbing head or flycutter, the two individual drives of toolholder and workholder are not only in positive drive relationship to each other but also with the displacement drive of the toolholder in the axis of rotation of the workpiece. In this way, it is possible by hobbing to produce also wide gears or, in the case of flycutter milling, a helical profiling. Upon hobbing or flycut milling the axial displaceability of the tool slide in particular is of advantage since, in this way, several tools, which may possibly also be different, can be arranged axially spaced from each other. It is thus possible, with automatic feeding and removal of the workpieces, to increase the intervals between the installation and removal of the tools since a change of tools can be obtained in simple manner by axial displacement of the tool slide. The axial change of tools is of advantage also when different toothings are to be produced on a workpiece. Different tools can then be arranged spaced apart axially on the toolholder.

The invention will be explained with reference to illustrative embodiments in the accompanying drawings, in which.

Figure 1:
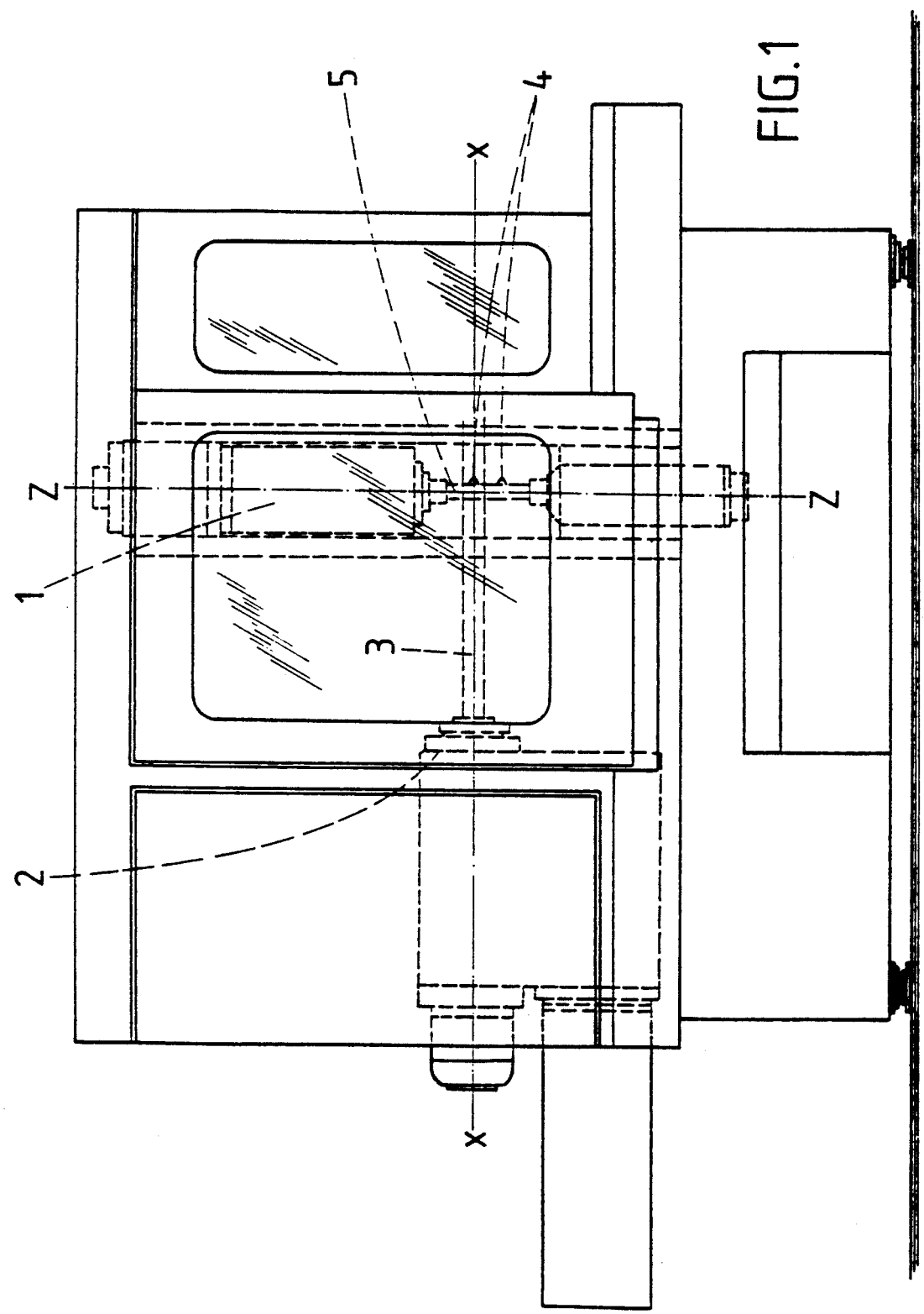
FIG. 1 is an overall view of a machine of this type.
Figure 2:
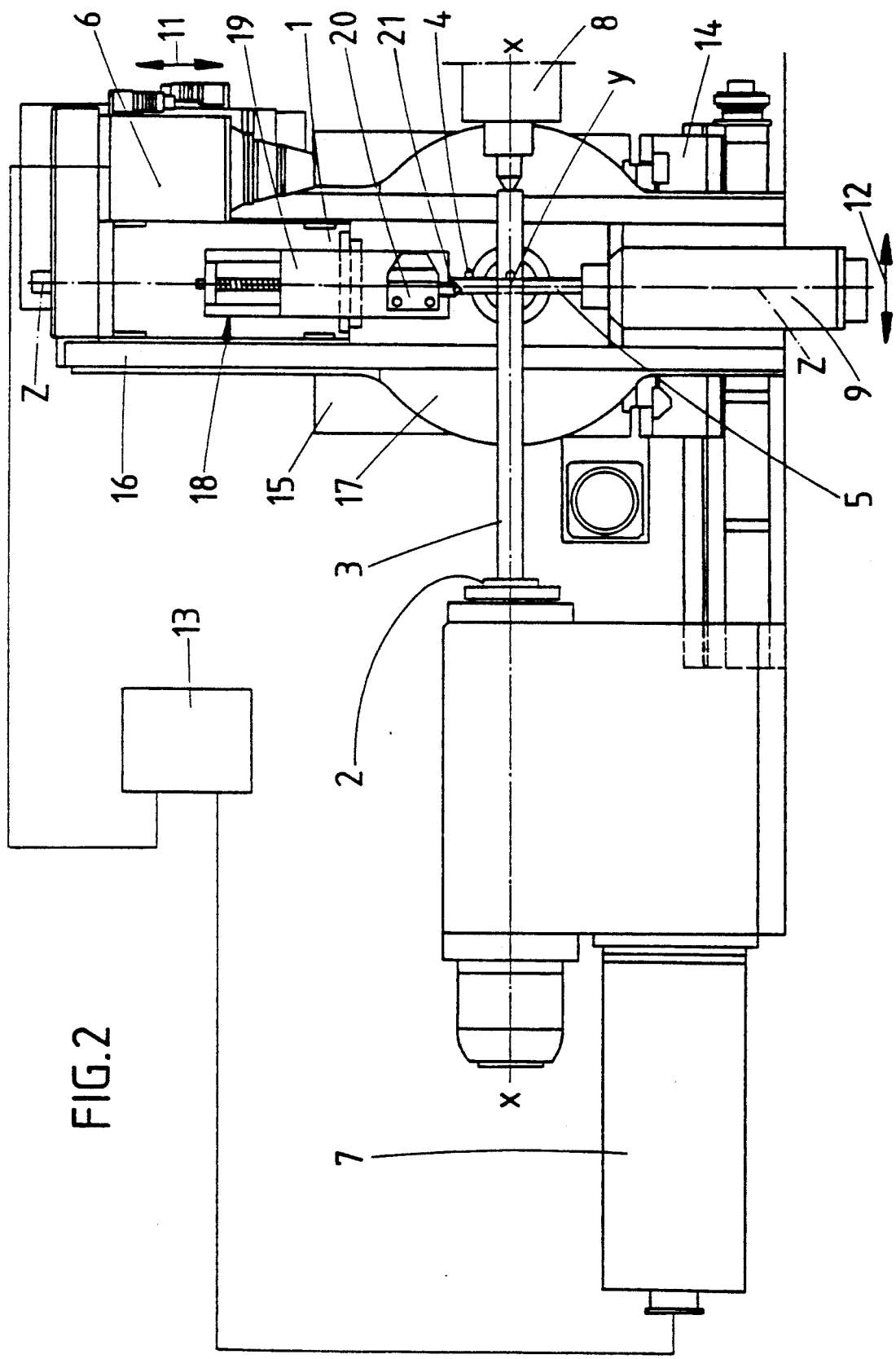
FIG. 2 is a diagrammatic showing of the drives of a machine in accordance with the invention, seen in elevation.
Figure 3:
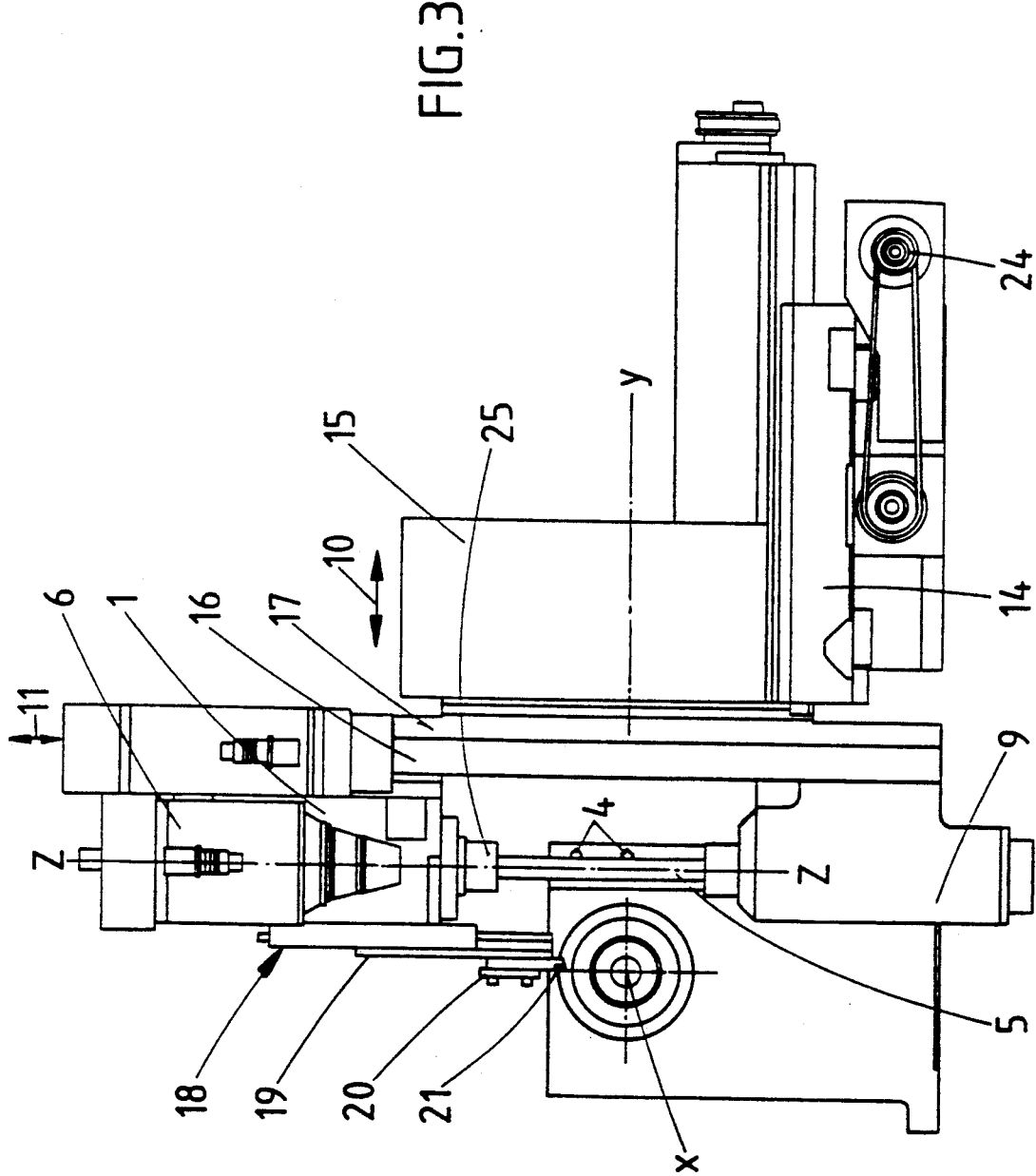
FIG. 3 is a side view corresponding to FIG. 2.
Figure 4:
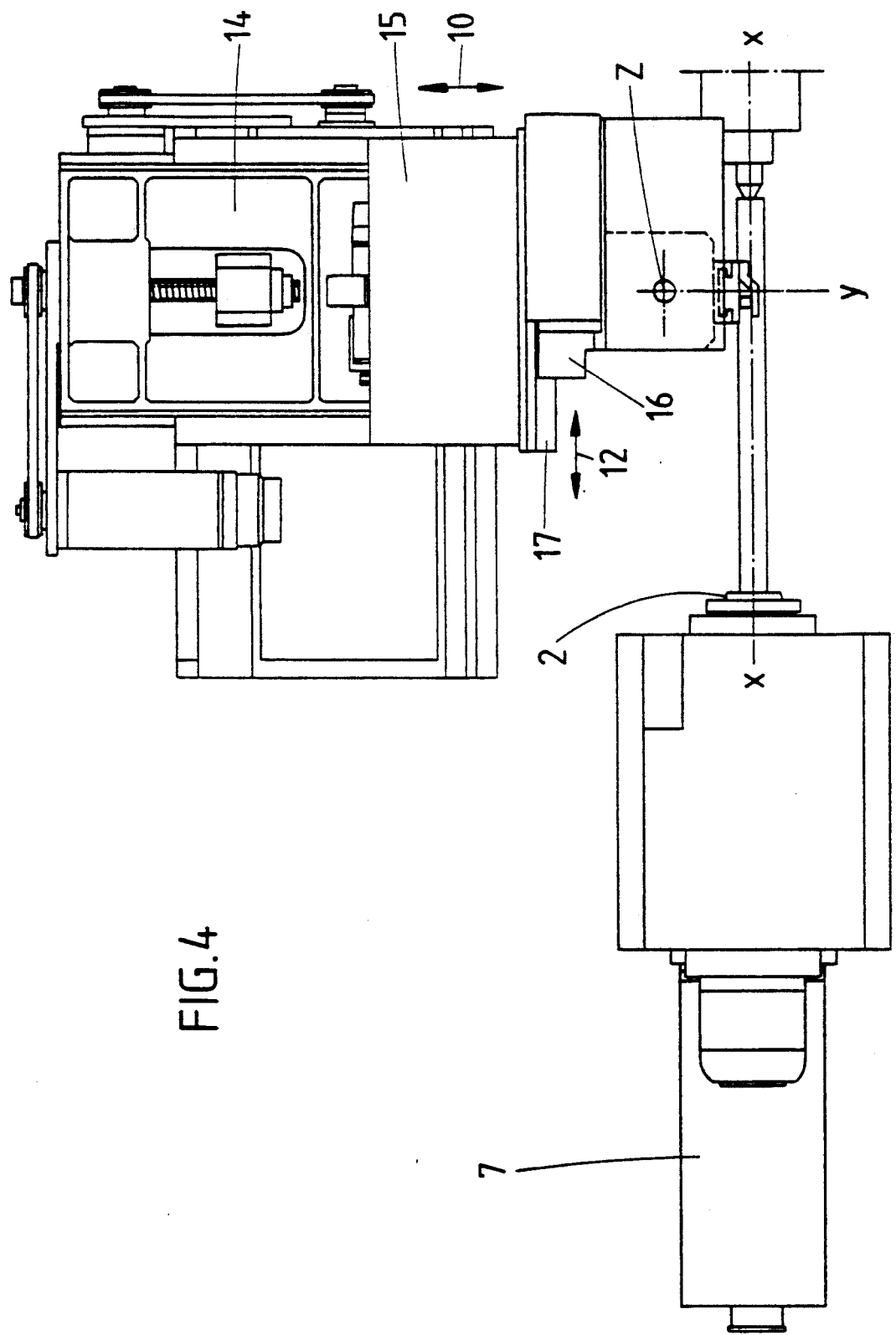
FIG. 4 is a top view corresponding to FIG. 2.

The machine shown in FIGS. 1 to 4 has a rotating, toolholder 2 which is fixed in space and driven by an individual electric drive 7. The workpiece 3 is clamped at its one end in the chuck of the toolholder 2. At its other end the workpiece is held by a bearing bracket 8. The axis of rotation of toolholder 2 and workpiece 3 forms the x-axis. Flycutters 4 are located at a distance from the x-axis. The flycutters 4 are arranged on a toolholder 5 which rotates around the z-axis. The toolholder 5 is clamped at its one in a toolholder chuck 25. The other end of the toolholder 5 is clamped in a bearing bracket 9. The toolholder chuck 25 is mounted in a housing 1. Housing 1, toolholder 5 and bearing bracket 9 are associated with a tool slide 16 which is displaceable in z-direction 11. The toolholder 5 is driven by an individual electric drive 6. The individual electric drives 6, 7 for the toolholder 5 and the workholder 2 are positively controlled by an electric synchronization device 13.

For the in-feed of the tool 4 upon tooth-cutting work on the workpiece, the tool can be fed in the Y-direction 10. For this purpose, there is provided a feed slide 15 which can be moved by an electric drive. The feed slide 15 is mounted on an advance slide 14 which can be displaced in x-direction also by an electric drive 24. On the feed slide 15 there is arranged a swivel support 17 which is swingable around the y-axis, which is perpendicular to the x- and z-axes. The tool slide 16 which supports toolholder chuck 25 and bearing bracket 9 is arranged on the swivel support 17, fixed for rotation, but displaceable on it in z-direction 11 also by an electric drive. X-axis and y-axis are skew to each other, the z-axis being swingable about an axis y which perpendicularly intersects both the x- and the z-axis.

Insofar as described, gear cutting can be effected in known manner with this machine. The toolholder 5 has a plurality of flycutters 4 which are axially spaced from each other in z-direction. This permits a simple change of the flycutters used. The tool slide 16 need merely be so displaced in the z-direction that a different flycutter 4 is brought into the position of use. Upon this displacement there is no change in the position of the axes x, y, z relative to each other. The tool is merely changed.

By the independent displaceability in z and y directions of the tool slide 16, an in-feed of a supplementary tool 21 seated thereon in the plane fixed by the y- and z-axes is possible. In this embodiment the supplementary tool 21 is developed as a lathe tool 21 which is clamped in a clamping device 20 which is mounted, fixed in position, on a setting slide 20. The setting slide 20 is displaceable in longitudinal direction on a support bracket. The completion-toolholder 18, which consists of support bracket, setting slide 19 and tool-clamping device 20, is fastened to its support bracket on the housing 1 of the toolholder chuck 25 (see FIGS. 1 to 4). By displacement in z-direction of the setting slide 19 which is mounted for longitudinal displacement, the lathe tool 21 can be brought into its operating position, in which it acts in cutting fashion on the rotating workpiece 3.

Figure 5:
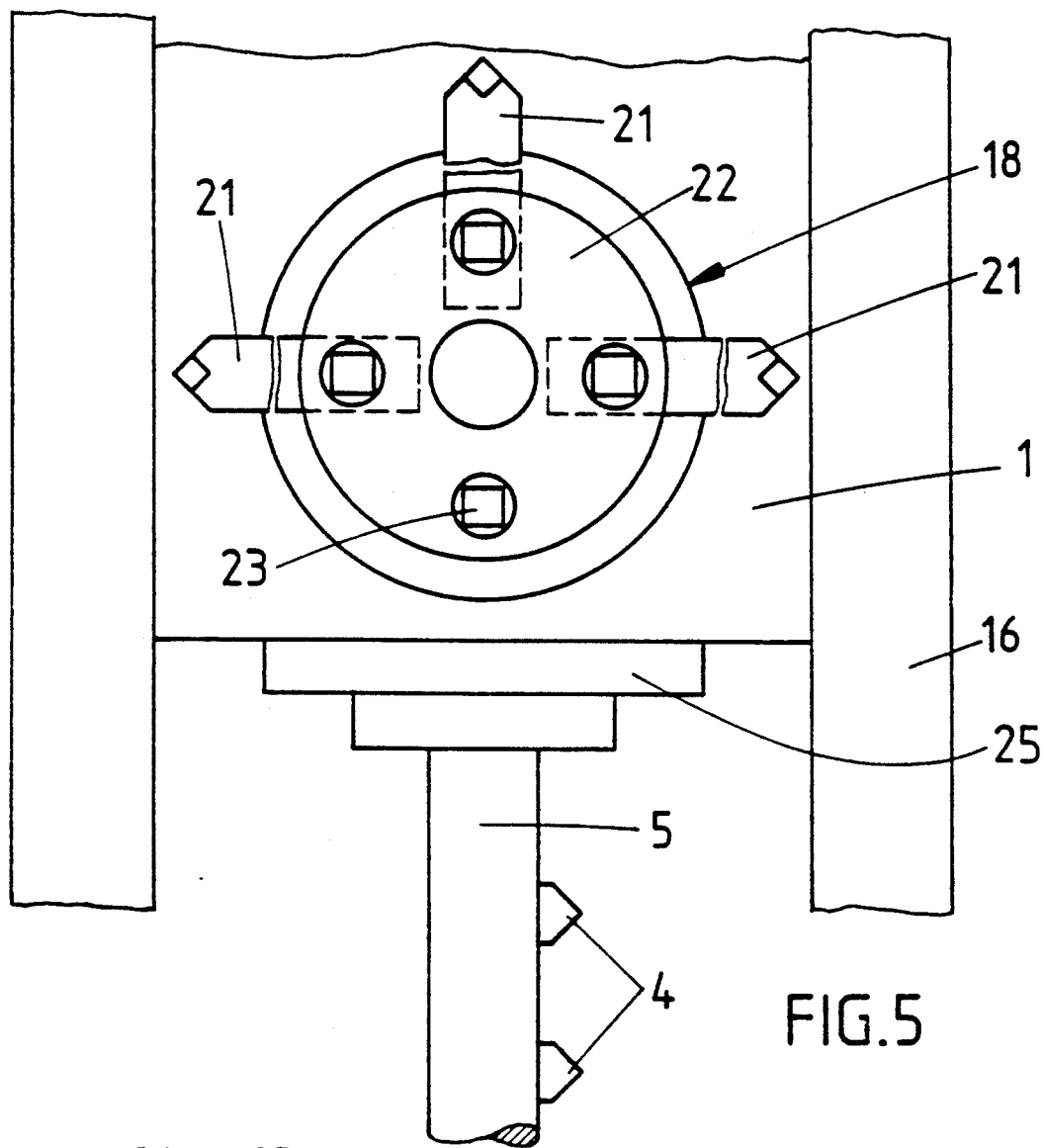
FIG. 5 is a detail view of a toolholder of another embodiment.
Figure 6:
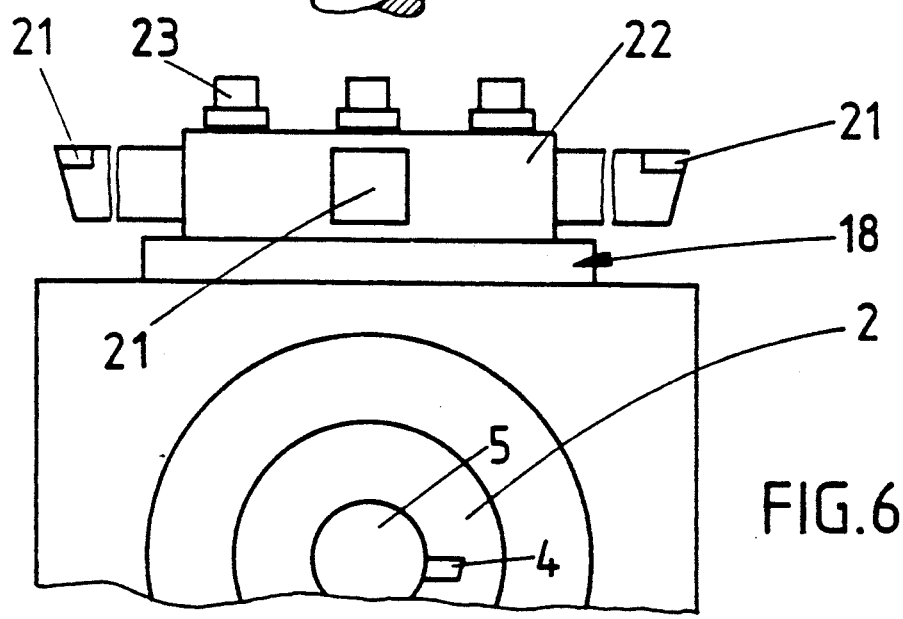
FIG. 6 is a side view of FIG. 5.

FIGS. 5 and 6 show another embodiment of the supplementary toolholder 18 which is mounted on the housing 1 of the toolholder chuck 24, as a tool changer 22 which is developed as turret and has, spaced 90° apart, four tool positions, three of which are provided with lathe tools 21. By turning the tool changer around its axis of rotation by in each case 90°, one of the three lathe tools 21 can be brought into the working position which is assumed during the cutting of the teeth by the free tool position 23. The free tool position 23 is so aligned in the direction of the toolholder 5 during the cutting of the teeth that no disturbing lathe tool protrudes into the machining space upon the toothcutting work. By rotation of the turret 22, the lathe tools can be brought into position 23, in which connection the lathe tool can then be fed to the workpiece 3 by displacement of the feed slide 15 in y-direction and the tool slide in z-direction.

For the rough and finished working of gears by rotation, the rotation of the toolholder 5 is stopped, the electric drive 6 of the tool and the electric drive 7 of the workpiece being disconnected from the synchronizing device 13. The electrical drive 7 of the workholder 2 now operates so that the high cutting speeds necessary for the lathe work can be obtained. By displacement of feed slide 15 and tool slide 16 in y and z directions respectively, the lathe tool 21 is fed into the workpiece 3. The displacement of the lathe tool in x-direction is effected by the displacement of the advance slide 14.

A workpiece 3 which has been cut with teeth by flycutter 4 can thus be deburred in simple manner at the end surfaces of the toothing. The toolholder 2 which, upon the cutting of the teeth rotates more slowly than the toolholder 5 by the number of teeth of the workpiece, is disconnected from the positive drive device 13 after the tooth-cutting so that it can be controlled directly via the individual drive 7. The speed of rotation of the workpiece 3 now no longer depends on the maximum speed of rotation of the toolholder 5 and can therefore be so increased that the high cutting speeds necessary for the lathe work can be achieved. The provision is made that the electric drives of feed slide 15, advance slide 14 and tool slide 16 are synchronizable with the spindle drive 7. Such a development makes it possible to cut non-circular profiles. During the lathe work, the tool drive 6 is also disconnected from the positive drive device and is stationary.

It is also contemplated that the supplementary tool be a drill or an end-mill. In this case also, the supplementary tool can be associated with a tool changer. Upon the working of a workpiece 5 with the last-mentioned tools, it is contemplated that the toolholder 2 does not rotate continuously but rather rotates stepwise. The machining of the workpiece then takes place with the workpiece stationary.

The features of the invention disclosed in the above specification, the drawing and the claims can be of importance, both individually and in any desired combination, for the reduction to practice of the invention. All features disclosed are essential to the invention. There is herewith also incorporated in its entirety in the disclosure of the application the disclosure of the corresponding/attached priority papers (copy of the prior application).

We claim:

1. A machine for the cutting machining of metal with workholder and toolholder rotating in positive drive with respect to each other, the axis (z) of which extending askew to the workholder axis of rotation (x) can be swung and locked in position around an axis (y) which intersects the axis of rotation (x) of the workpiece and the axis (z) of the toolholder at right angles, the toolholder being displaceable in the direction of the axis of rotation (x) of the workholder and of the axis of swing (y) of the toolholder, characterized by two individual drives (6, 7) for workholder (2) and toolholder (5), which drives are connected by an electronic positive drive device (13) and can each be disconnected from it, the toolholder (5) on its part being seated on a tool slide (16) which is displaceable along the axis (z) of the toolholder and on which, in addition, there is arranged a supplementary toolholder (18) which can be brought into working position by relative movement to the tool slide (16).

2. A machine, in particular according to claim 1, characterized by the fact that the supplementary toolholder (18) is borne by the housing (1) of the toolholder chuck (25).

3. A machine, in particular according to claim 1, characterized by the fact that the toolholder (5), when the supplementary tool (21) has been brought into working position, assumes a backward displaced position and the individual drives (6, 7) are disconnected from the positive drive device (13).

4. A machine, in particular according to claim 1, characterized by the fact that the supplementary toolholder (18) bears one or more lathe tools (21).

5. A machine, in particular according to claim 1, characterized by the fact that the supplementary toolholder (18) is developed as a tool change device (22).

6. A machine, in particular according to claim 5, characterized by the fact that the tool change device is developed as a turret (22), one tool position (23) being unoccupied.

7. A machine, in particular according to claim 1, characterized by the fact that the toolholder displacements in the three directions in space (x, y and z directions) are electronically controllable and synchronizable with the rotary displacement of the workpiece.

8. A machine, in particular according to claim 1, characterized by the fact that the speed of rotation of the work spindle can be adjusted within a range of 0 to 3000 rpm.

9. A machine, in particular according to claim 1, characterized by the fact that the supplementary toolholder (18) bears one or more end mills.

10. A machine, in particular according to claim 1, characterized by the fact that the supplementary toolholder (18) bears a drill.

11. A machine, in particular according to claim 1, characterized by the fact that the toolholder is rotatable stepwise.

12. A machine, in particular according to claim 1, characterized by the fact that the displaceability of the tool slide (16) in the axis of rotation of the workholder is electronically controlled in synchronism with the rotary movements of toolholder (5) and workholder (2).

13. A machine, in particular according to claim 1, characterized by the fact that the tool is developed as a hobbing head.

14. A machine, in particular according to claim 1, characterized by the fact that the toolholder (5) bears one or more flycutters.

15. A machine, in particular according to claim 1, characterized by the fact that the tools (4) borne by the toolholder (5) are arranged axially spaced apart from each other on the tool axis.

* * * * *